US 6,647,660 B1

(12) United States Patent
Kruger

(10) Patent No.: US 6,647,660 B1
(45) Date of Patent: Nov. 18, 2003

(54) FISHING LURE WITH NYLON HAIR TAIL

(76) Inventor: C. Baxter Kruger, 4656 Hazelwood Dr., Jackson, MS (US) 39211

( * ) Notice: Subject to any disclaimer, the term of this patent is extended or adjusted under 35 U.S.C. 154(b) by 226 days.

(21) Appl. No.: 09/665,907

(22) Filed: Sep. 20, 2000

Related U.S. Application Data

(62) Division of application No. 09/301,326, filed on Apr. 29, 1999, now abandoned.
(60) Provisional application No. 60/083,865, filed on May 1, 1998.

(51) Int. Cl.⁷ .............................................. A01K 85/00
(52) U.S. Cl. ..................................................... 43/42.53
(58) Field of Search ...................................... 43/42.53

(56) References Cited

U.S. PATENT DOCUMENTS

| | | |
|---|---|---|
| 586,620 A | 7/1897 | Osborn |
| 865,683 A | 9/1907 | Credlebaugh |
| 963,202 A | 7/1910 | Bohannan |
| 981,454 A | 1/1911 | Miller et al. |
| 1,390,601 A | 9/1921 | Caldwell |
| 1,459,042 A | 6/1923 | Wrege |
| 1,568,325 A | 1/1926 | Dewey |
| 1,881,823 A | 10/1932 | McKenzie |
| 1,967,692 A | 7/1934 | Walker |
| 2,166,585 A * | 7/1939 | Evans ........................ 43/42.53 |
| 2,189,487 A | 2/1940 | Davenport |
| 2,219,225 A | 10/1940 | Gambill |
| 2,254,949 A | 9/1941 | Messacar |
| 2,317,781 A | 4/1943 | Lehto |
| 2,515,591 A | 7/1950 | Clink |
| 2,583,942 A | 1/1952 | Harvey |
| 2,594,264 A * | 4/1952 | Riner ......................... 43/42.53 |
| 2,618,094 A * | 11/1952 | Shindler ..................... 43/42.53 |
| 2,619,762 A | 12/1952 | Summitt, Sr. |
| 2,620,587 A * | 12/1952 | Green ......................... 43/42.53 |
| 2,627,135 A | 2/1953 | Franklin |
| 2,643,418 A * | 6/1953 | Auldridge ................... 43/42.53 |
| 2,691,235 A | 10/1954 | Pcola |
| 2,728,160 A | 12/1955 | Franklin |
| 2,996,826 A | 8/1961 | Lamar |
| 3,017,307 A * | 1/1962 | Halliburton ................ 43/42.53 |
| 3,191,336 A | 6/1965 | Cordell, Jr. |
| 3,590,514 A * | 7/1971 | Begley ....................... 43/42.53 |
| 3,654,724 A | 4/1972 | Charron |
| 3,659,371 A * | 5/1972 | Duescher .................... 43/42.25 |
| 3,690,028 A * | 9/1972 | Walker, Jr. .................. 43/42.28 |
| 3,959,060 A | 5/1976 | Jones |
| 3,979,853 A | 9/1976 | Storm et al. |
| 4,098,017 A | 7/1978 | Hall |
| 4,149,334 A * | 4/1979 | Rogers ....................... 43/42.25 |
| 4,215,506 A * | 8/1980 | LeBoeuf ..................... 43/42.05 |
| 4,464,857 A | 8/1984 | Olszewski |
| 4,637,159 A | 1/1987 | Kulis |
| 4,873,782 A | 10/1989 | Gudermuth, Jr. |
| 4,908,975 A * | 3/1990 | Root et al. .................. 43/42.25 |
| 4,959,920 A | 10/1990 | Walker |
| 5,007,193 A * | 4/1991 | Goodley et al. ............ 43/42.28 |
| 5,084,996 A | 2/1992 | Woodruff et al. |
| 5,251,395 A * | 10/1993 | Wicklund .................... 43/42.25 |
| 5,381,620 A | 1/1995 | Gibbs |
| 5,561,938 A | 10/1996 | Kato et al. |
| 5,956,888 A * | 9/1999 | Vreeland et al. ............ 43/42.53 |
| 5,960,580 A * | 10/1999 | Link .......................... 43/42.53 |

* cited by examiner

Primary Examiner—Kurt Rowan
(74) Attorney, Agent, or Firm—Nixon & Vanderhye P.C.

(57) ABSTRACT

A fishing lure is particularly constructed to effect a side-to-side swimming action and a life-like appearance. The lure is jointed at its midsection to enhance the life-like swimming action. The tail of the lure is formed using a plurality of hair-like nylon strands that are bundled at one end and shaped as desired to simulate a life-like fish tail. The bundled end is inserted into a slot in the tail section of the lure.

8 Claims, 4 Drawing Sheets

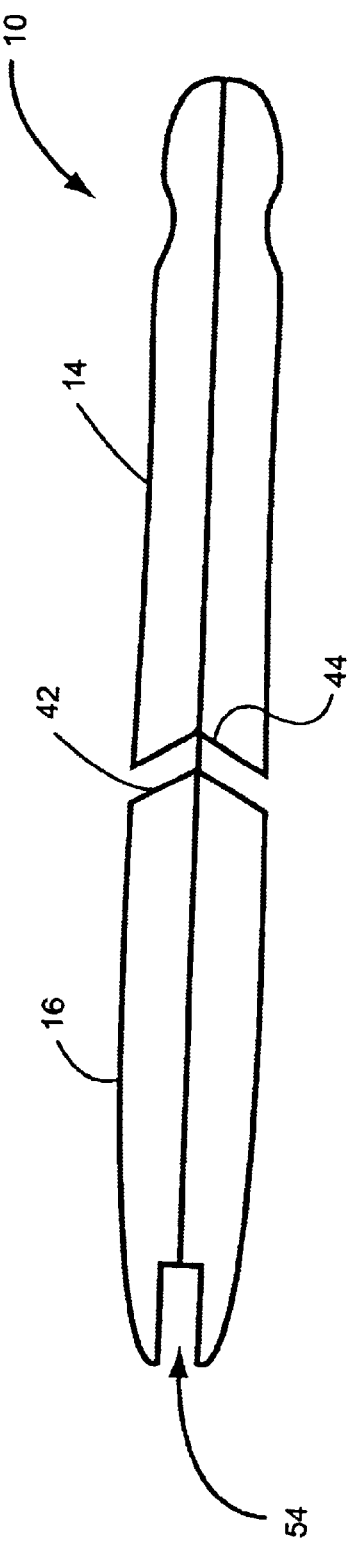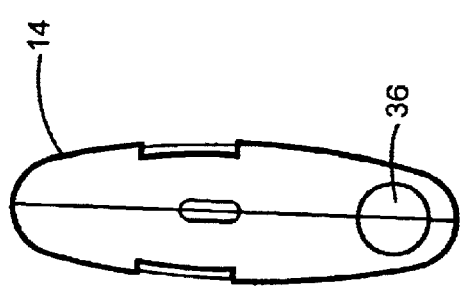

FISHING LURE WITH NYLON HAIR TAIL

This application claims the benefit of Provisional Application No. 60/083,865 filed May 1, 1998.

This is a divisional of application Ser. No. 09/301,326, filed Apr. 29, 1999, now abandoned, the entire content of which is hereby incorporated by reference in this application.

BACKGROUND OF THE INVENTION

The present invention relates to fishing lures and, more particularly, to life-like fishing lures including a nylon hair strand tail.

In designing a fishing lure, it is desirable for the lure to simulate a live bait fish in appearance and swimming action. There currently exists numerous fishing lures with a body separated into at least two parts connected by a joint, enabling the parts of the body to pivot relative to each other. The construction of these lures, however, produces only a moderate imitation of the natural side-to-side swimming action of a live bait fish, and without proper weighting, conventional lures tend to lay on their side or turn over in the water.

Additionally, it has been difficult to develop proper and effective simulations of a fish tail for the lure, and tails in conventional lures are typically replaced with a hook or a plastic tail simulation. Because a live fish relies on its tail for propulsion and direction control, it has been discovered that the tail becomes an important component to simulating life-like swimming action of the lure as well as an integral component for simulating the appearance of a fish.

SUMMARY OF THE INVENTION

There is thus a need for a fishing lure that better simulates the appearance and swimming action of bait fish. In accordance with an aspect of the present invention, an articulated fishing lure is provided with a simulated tail that is formed with a combination of nylon strands with glittery strands and buck tail, which not only greatly improve the simulated appearance of the fishing lure, but also effect a natural swimming action by the lure.

Thus, according to the invention, there is provided a method of constructing a fishing lure including a tail slot. The method includes the steps of providing a plurality of nylon strands, binding an insert end of the strands, shaping the bound insert ends to fit in the tail slot, trimming a flared end of the strands, opposite from the insert end, into a desired shape, and affixing the bound insert end in the tail slot. Discontinuity strands such as glitter strands and buck tail may be added to the strand bundle to provide a desired appearance. The binding step may be practiced by melting the insert ends of the strands together or by clipping the strands with a binding clip. Shaping of the bound insert end to fit in the tail slot can be performed by one of trimming or sanding or both to achieve a desired shape. The bound insert end is preferably affixed in the tail slot by gluing.

In preferred forms, the insert end of the strands is pinched using a tool or the like thereby flaring the flared ends of the strands. The strands adjacent the pinched insert ends are grasped, and the pinched insert end can then be released. In this manner, the insert end of the strands can be readily bound using a cigarette lighter, match, heated plate, solder gun or the like.

In accordance with another aspect of the invention, there is provided a fishing lure including a body resembling a fish with a tail slot at an end thereof and a tail affixed in the tail slot. The tail includes a plurality of strands of nylon, wherein an insert end of the strands is bound and shaped to fit in the tail slot, and wherein a flared end of the strands, opposite from the insert end, is formed into a desired shape.

In accordance with still another aspect of the invention, there is provided a tail for a fish-shaped fishing lure that includes a plurality of nylon strands. The insert ends of the strands are bound and shaped to engage the fishing lure, and flared ends of the strands, opposite from the insert ends, are formed into a desired shape.

BRIEF DESCRIPTION OF THE DRAWINGS

These and other aspects and advantages of the present invention will be described in detail with reference to the accompanying drawings, in which:

FIG. 2A is a cross-sectional view along the line A–A' in FIG. 2;

FIG. 3 is a top plan view of the assembled fishing lure; and

DETAILED DESCRIPTION OF PREFERRED EMBODIMENTS

Figure 1:
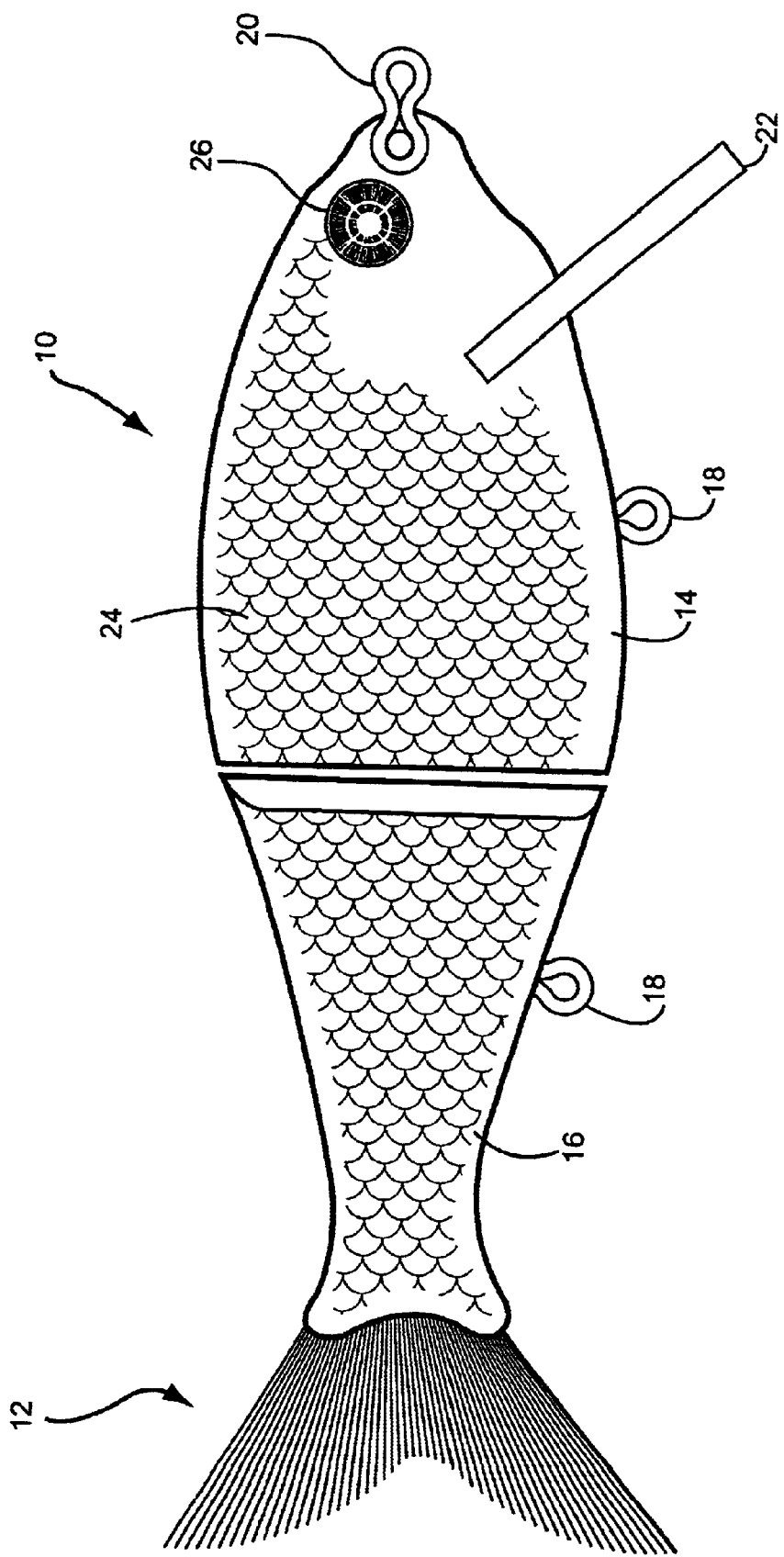
FIG. 1 is a side view of the fishing lure according to the present invention.

An exemplary fishing lure 10 according to the present invention is illustrated in FIG. 1. The fishing lure in FIG. 1 is an exemplary design intended to match the shape and appearance of a gizzard shad (Dorosoma Cepedianum) including its tail 12. Of course, those of ordinary skill in the art will contemplate alternative designs for the appearance of the fishing lure, and the invention is not meant to be limited to the illustrated configuration.

The lure 10 is divided into a body section 14 and a tail section 16 that are jointed by a suitable swivel joint (described below). When assembled, without the tail 12, the overall body length is about 5.5". One or more hook hangers 18 and a line pull 20 are appropriately secured to the lure 10. A separately formed and subsequently attached lip 22 is secured to the body 14 of the lure 10. The lure 10 is preferably finished with an iridescent paint sprayed over a highly reflective metal covering and is covered with a heat transferred decal including colors, lines and markings to give the lure a distinctive life-like look. A high-gloss acrylic paint over the decal gives the lure a glossy, wet look. The sides of the lure are textured to a depth of 0.005" by acid etching the mold, giving the lure body the appearance of having scales. The reflective metal covering, iridescent paint, decal, acrylic paint and texture in combination define the finish 24 of the lure. An acrylic or glass eye 26 is secured to each side of the lure 10 with an adhesive or the like.

Each section 14, 16 of the lure 10 is formed in two halves (four separate parts total) preferably by injection molding using a polymer material such as ABS or polycarbonate. Other alternative materials can be used to form the lure of the invention using any known means as would be apparent to those of ordinary skill in the art.

Figure 2:
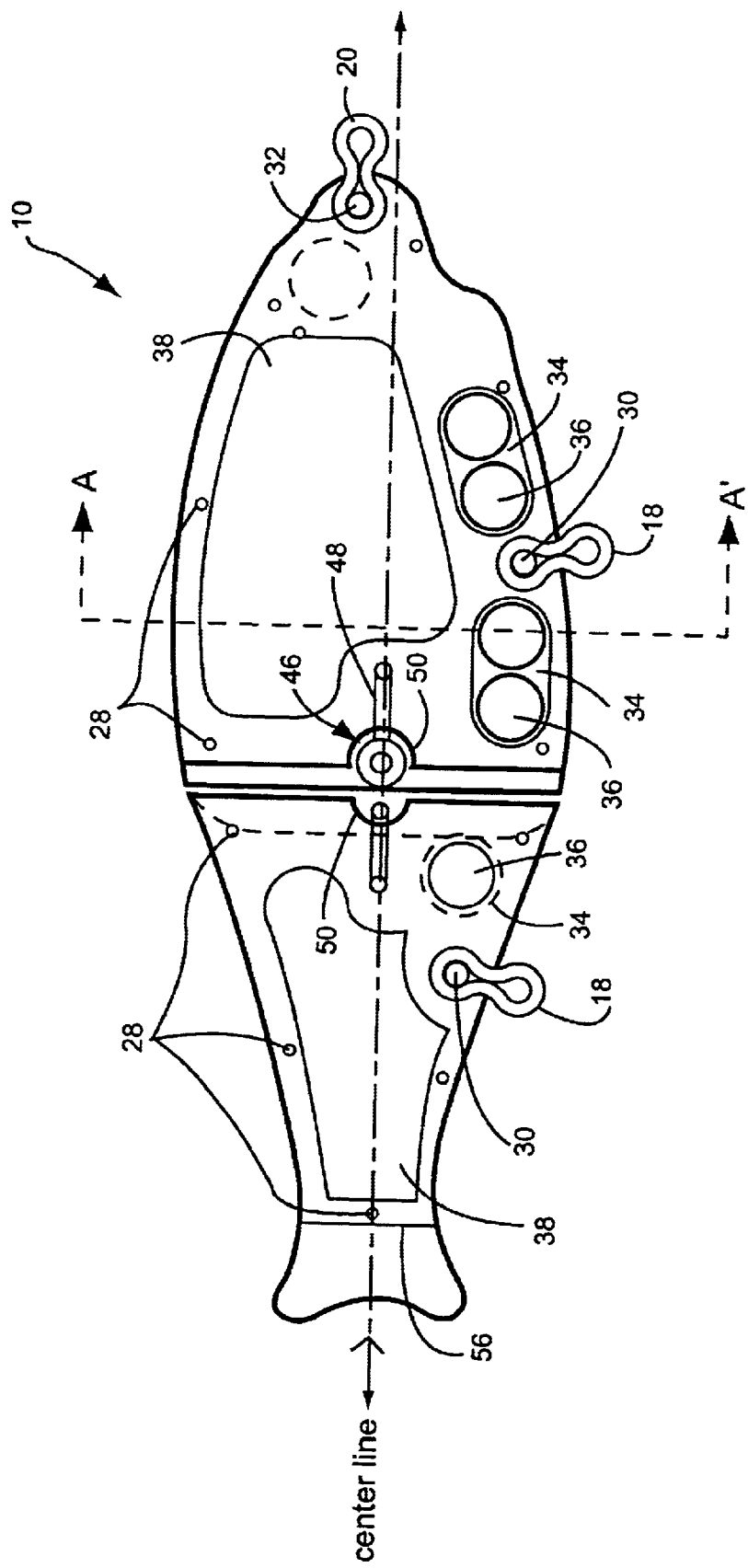
FIG. 2 illustrates a cross-section of the fishing lure illustrated in FIG. 1.

Referring to FIG. 2, a cross section of the lure 10 according to the present invention is illustrated. Each half of each section 14, 16 of the lure is provided with complementary chambers and posts and the like corresponding to its respective other half for containing components of the lure and for effecting assembly of the halves and sections. For example, as shown in FIG. 2, the lure is provided along an internal border thereof with a plurality of alignment posts 28. These posts 28 engage corresponding apertures in the facing opposite halves of the lure. Each section 14, 16 also includes respective hook hanger posts 30, receiving the hook hangers 18, and a line pull post 32, receiving the line pull 20. Corresponding apertures are provided in the opposite halves of the sections 14, 16 for receiving the posts 30, 32 and thereby securing the hook hangers 18 and line pull 20, respectively. The respective parts of the body section 14 and the tail section 16 are solvent welded together to form a union. When assembled, as shown in FIG. 2A, the head of the lure is preferably conically shaped and about 0.52" in width, 2.76" in length, and 1.81" in height at its highest point.

As shown, the lure also includes one or more weight chambers 34 for receiving ball bearings 36 or the like that can be customized to effect the swimming action of the lure. That is, using various combinations of weights of ball bearings 36, the lure can be configured to sink, float or suspend as desired. The ball bearings 36 can range from 1/16" to 3/8" in diameter. The lure also includes one or more buoyancy chambers 38 that effect the buoyancy and swimming action of the lure 10. The wall thickness of each section 14, 16 is preferably about 0.1".

A slot 40 is also provided in the body section 14 of the lure 10 for receiving the lip 22. The lip 22 is preferably a reinforced tear-shaped lip, approximately 1.27" in length and 0.9" in width, which is reinforced at its back by a rib (not shown), 0.83" in length and 0.3" in width with 0.15" rounds at the top and bottom of the rib. This reinforced tear-shaped lip 22 is molded separately from the lure sections 14, 16 and is not part of the body section 14 of the lure until it is inserted and glued. The lip is inserted into the head of the lure at an angle of about 67.2°.

With continued reference to FIG. 2 and with reference to FIG. 3, the assembled tail section 16 defines a convex angle 42 at the joint between the body section 14 and tail section 16 of the lure. The assembled body section 14 defines a concave angle 44 substantially corresponding to the convex angle 42 of the tail section 16. The angles 42, 44 at the joint between the body section 14 and tail section 16 of the lure enable the lure to pivot predetermined desired amounts and thereby control the swimming action of the lure. A swivel joint 46 is secured between respective sections 14, 16 of the lure 10 as shown, for example, in FIG. 2. In an exemplary configuration, the swivel joint 46 includes a pair of eyelets 48 mounted in each section 14, 16, respectively at 90° orientation relative to each other. A swivel area for the swivel joint 46 is defined by appropriately shaped cut outs 50 in the lure sections. The eyelets 48 are preferably secured to the respective sections 14, 16 with a 90° bent leg positioned in a corresponding receiving aperture. Of course, those of ordinary skill in the art will contemplate alternatives for the swivel joint according to the invention, and the invention is not meant to be limited to the described and illustrated structure. Indeed, any swivel joint that enables the sections 14, 16 to readily pivot relative to each other could be used.

A tail receiving section 54 is defined by facing stepped areas 56 of the corresponding halves in the tail section 16. The tail receiving section 54 is sized to receive the lure tail 12 as shown in FIG. 1.

Figure 4A:
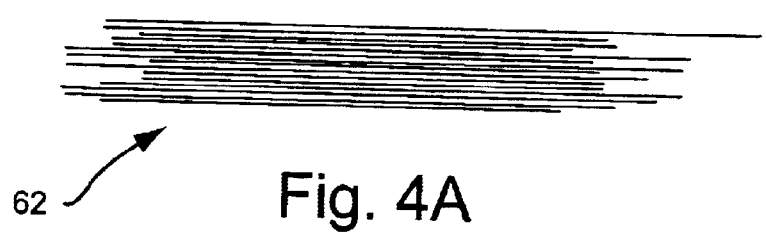
FIGS. 4A–4C illustrate the process for manufacturing the lure tail.
Figure 4B:
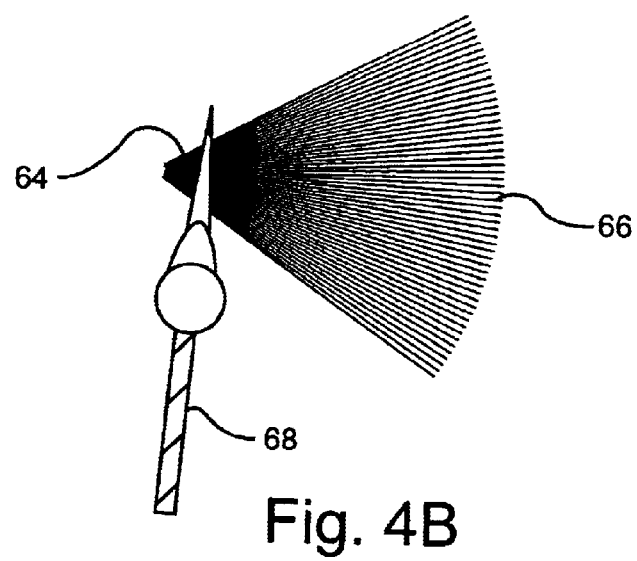
Figure 4C:
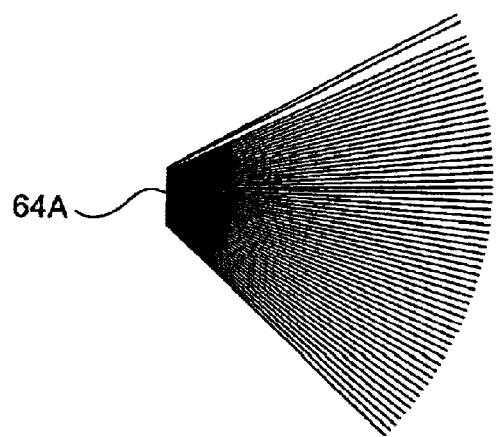

The tail 12 and the process for constructing the tail will be described with reference to FIGS. 4A–4C. In preferred forms, the tail 12 according to the invention is formed using a plurality of micro-fiber nylon strands or hair-like nylon strands. An example of a suitable product is the Super Hair product available from Bestway Outdoor of Colombia, S.C. Also preferably included in the strand bundle are additional discontinuity strands such as glittery Flashabou™ or Crystal Flash™ available from Orvis of Jackson, Miss. Suitably dyed buck tail may also be included with the bundle as desired.

In order to form the tail 12, two to three inch strands of the nylon strands are cut to form a bundle 62 approximately 3/16" to 5/16" in diameter (approximately 500 strands). The discontinuity strands can be added as desired. When the bundle is complete, one end 64 of the bundle is cut to provide a clean edge. At the clean edge side, the bundle is gathered and pinched by hand or with pliers or the like to flare the opposite end 66 of the bundle into a fan-shaped pattern. The bundle is then grabbed at an intermediate portion with one end pinched and the other end flared, preferably with a tool such as needlenose pliers 68. The pinched end is then bound together such as by melting the nylon strands or attaching a binder clip or the like. The melting of the pinched end can be effected in any suitable manner such as with a match or cigarette lighter, a soldering gun, a hot plate or the like. It is possible that the type of discontinuity strands added to the nylon strand bundle do not melt. For example, buck tail does not melt. These strands are bound with the bundle by the melted nylon strands.

The bound pinched end 64A of the bundle can then be shaped to fit into the tail slot 54. In particular, the bound end can be flattened with the pliers or other tool and/or can be trimmed or sanded using appropriate tools to form a suitable shape. The flared end of the bundle can then be trimmed with scissors to match the desired tail appearance, for example, as shown in FIG. 1. The tail 12 is then inserted into the tail slot 54 and secured with an adhesive.

With the structural configuration of the lure according to the invention described above, the lure exhibits unique life-like swimming action in use. A number of features of the lure particularly effect the life-like swimming action. In particular, as noted, the lip 22 is preferably tear-shaped and placed at an angle of 67.2° in the head of the lure. The location of the lip and the angle of placement controls the amount of drag, which produces a side-to-side action. From the pull point at the front of the lure to the end of the tail section 16, the top of the lure is rounded and not squared (see FIG. 2A). This allows the water to flow over the top of the lure without creating additional drag. In turn, this allows the lip placement and angle to control the drag and thus the side-to-side action of the lure.

The side-to-side action of the lure created by the lip 22 and rounded top is transformed into a smooth swimming action via the swivel joint 46. The location of the joint 46, the beveled design 42, 44 of the sections 14, 16 of the lure coming together at the joint 46, and the joint connectors 48 effect the smooth swimming action. The joint 46 allows the tail section 16 to move in the opposite direction of the body section 14. When the side-to-side action of the body section 14 is moving to the right, the tail section 16 is moving to the left and vice versa, which makes the lure appear to swim like a live fish.

Additionally, the weighting of the lure with the weights 36 keep the lure balanced. Primarily, the weights make the lure sit properly in the water at a 0° attitude. The top of the lure remains at the top, and the bottom remains at the bottom when the lure is in the water. instead of laying on its side or turning over. Additionally, the weights 36 keep the lure balanced when it is being pulled and drag is being created by the lip 22. The drag created by the lip 22 would naturally make the lure spin or swim on its side. The specific placement of the weights (e.g., two in the body section 14, and one in the tail section 16) counteract the drag so that the action is side-to-side instead of spinning and the lure maintains a proper attitude. Additionally, the weights 36 counteract the natural vertical movement created by the lip drag. The drag created by the lip 22 naturally makes the lure body section 14 go downward and the tail section 16 go upward. The weights 36 counteract this tendency and keep the lure level when being pulled through the water.

Still further, by the structure of the lure according to the invention, the lure is designed so that it will turn away from the angler from 10° to 300° as it is stopped suddenly, giving the appearance that the lure is turning around to look behind it. This unique turning around action is created by the combination of the life-like swimming action of the lure, stopping of the lure suddenly, and the natural forces of the water operating on the lure and the joint of the lure. As the lure is pulled through the water, it moves from side to side by virtue of the drag created by the lip 22. When the lure is stopped suddenly, inertia forces the lure forward. When the lure is stopped and the head section is moving to the right, for example, this inertia forces the head of the lure to move further to the right. The joint 46 of the lure separates the force of inertia into two forces. That is, if the lure broke apart at the joint 46, the force of inertia would push the body section 14 to the right and push the tail section 16 straight. If the lure was not jointed, inertia would force the lure to move forward and veer slightly to the right or left. The joint 46 channels inertia in the body section 14 pushing it forward. When the forward push is combined with the side-to-side action of the lure, it pushes the body section 14 further to the right, for example. As the head of the lure turns and the tail section 16 bends, the large side of the body section 14 of the lure creates additional drag. This drag acts to stop the forward motion of the lure and channel the remaining inertia to the body section 14 to turn it further.

The joint 46 channels the inertia of the tail section 16 forward. When this is combined with the fact that the tail section 16 is still connected to the body section 14, the effect is to push the back of the body section 14 straight ahead, thus forcing the front of the body section 14 further around to the right. The body section 14 then naturally slows down and stops, and the remaining inertia is transferred to the tail section 16, which is trying to continue its straight momentum. Because the tail section 16 is still connected to the body section 14, the tail section 16 follows the path of the body section 14 around to the right. With this swimming action, the lure according to the invention is extremely versatile. The lure can be cranked steadily as a swimming lure or fished with a swim and stop action as a finesse bait, or twitched erratically as a wounded bait fish.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of constructing a fishing lure including a tail slot, the method comprising:
   (a) providing a plurality of nylon strands;
   (b) binding an insert end of the strands;
   (c) shaping the bound insert end to fit in the tail slot;
   (d) trimming a flared end of the strands, opposite from the insert end, into a desired shape; and
   (e) affixing the bound insert end in the tail slot, wherein step (b) is performed prior to step (c), and wherein at least steps (a)–(c) are performed prior to step (e).

2. A method according to claim 1, wherein step (a) comprises (a-1) mixing a plurality of discontinuity strands with the plurality of nylon strands.

3. A method according to claim 2, wherein step (a-1) is practiced by mixing glitter strands and buck tail with the plurality of nylon strands.

4. A method according to claim 1, wherein step (b) is practiced by melting the insert ends of the strands together.

5. A method according to claim 1, wherein step (b) is practiced by clipping with a binder clip the insert ends of the strands together.

6. A method according to claim 1, wherein step (c) is practiced by at least one of trimming or sanding the insert end to fit in the tail slot.

7. A method according to claim 1, wherein step (e) is practiced by gluing the bound insert in the tail slot.

8. A method according to claim 1, further comprising, after step (a), the steps of pinching the insert end of the strands and thereby flaring the flared end of the strands, grasping the strands adjacent the pinched insert end of the strands, and releasing the pinched insert end.

\* \* \* \* \*